(12) United States Patent
Onimaru et al.

(10) Patent No.: US 7,559,863 B2
(45) Date of Patent: Jul. 14, 2009

(54) CHAIN TENSIONER

(75) Inventors: Kouichi Onimaru, Iwata (JP); Seiji Sato, Iwata (JP); Satoshi Kitano, Iwata (JP); Yoshiaki Ryouno, Iwata (JP); Hisashi Hayakawa, Iwata (JP)

(73) Assignee: NTN Corporation, Osaka (JP)

( * ) Notice: Subject to any disclaimer, the term of this patent is extended or adjusted under 35 U.S.C. 154(b) by 143 days.

(21) Appl. No.: 11/892,880

(22) Filed: Aug. 28, 2007

(65) Prior Publication Data
US 2008/0261736 A1  Oct. 23, 2008

(30) Foreign Application Priority Data
Sep. 1, 2006  (JP) .............................. 2006-237822

(51) Int. Cl.
*F16H 7/08* (2006.01)
(52) U.S. Cl. .................. 474/110; 474/101; 474/109; 474/111
(58) Field of Classification Search ........... 474/110, 474/111
See application file for complete search history.

(56) References Cited

U.S. PATENT DOCUMENTS

| | | | |
|---|---|---|---|
| 7,189,174 B2* | 3/2007 | Yamamoto et al. | 474/109 |
| 7,455,607 B2* | 11/2008 | Narita et al. | 474/109 |
| 2002/0094894 A1* | 7/2002 | Poiret et al. | 474/101 |
| 2004/0266571 A1* | 12/2004 | Izutsu et al. | 474/110 |

FOREIGN PATENT DOCUMENTS

| | | | |
|---|---|---|---|
| JP | 11101318 A | * | 4/1999 |
| JP | 2000-179632 | | 6/2000 |
| JP | 2002156013 A | * | 5/2002 |
| JP | 2002364720 A | * | 12/2002 |
| JP | 2005-042806 | | 2/2005 |
| JP | 2006214519 A | * | 8/2006 |

* cited by examiner

*Primary Examiner*—Robert A Siconolfi
*Assistant Examiner*—San Aung
(74) *Attorney, Agent, or Firm*—Wenderoth, Lind & Ponack, L.L.P.

(57) ABSTRACT

A stepped set groove having shallow and deep portions is formed in the inner periphery of a cylinder chamber formed in a housing of a chain tensioner near its open end. A radially and elastically deformable set ring having circumferentially separated ends is received in the set groove in a radially compressed state. The set ring has at the respective ends thereof a pair of grip portions which are received in a cutout formed in housing at its front end. By engaging the set ring in an engaging groove formed in the outer periphery of the plunger near its front end and the shallow portion, it is possible to keep the plunger pushed into the cylinder chamber. In this state, the chain tensioner is mounted in position. One of the grip portions is brought into abutment with one of the circumferentially opposed end walls of the cutout to prevent the plunger from rotating about its axis in such a direction that the axial gap between an internal thread of the plunger and an external thread of a screw rod inserted in the plunger disappears. Thus, it is possible to keep the axial gap larger than the axial distance by which the plunger has to be moved to move the set ring from the shallow portion into the deep portion. This makes it possible to disengage the set ring from the engaging groove by pushing the plunger into the cylinder chamber.

1 Claim, 4 Drawing Sheets

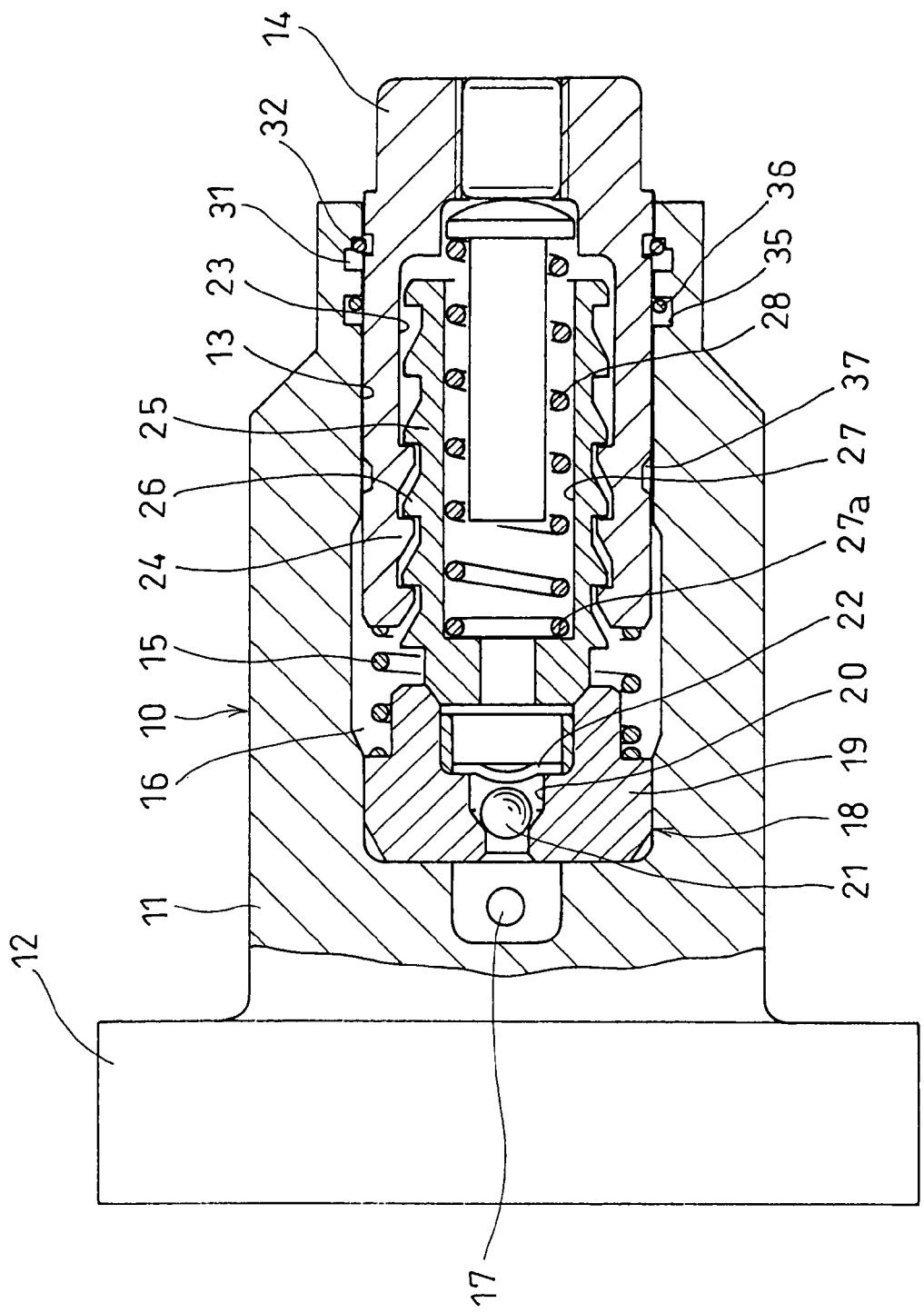

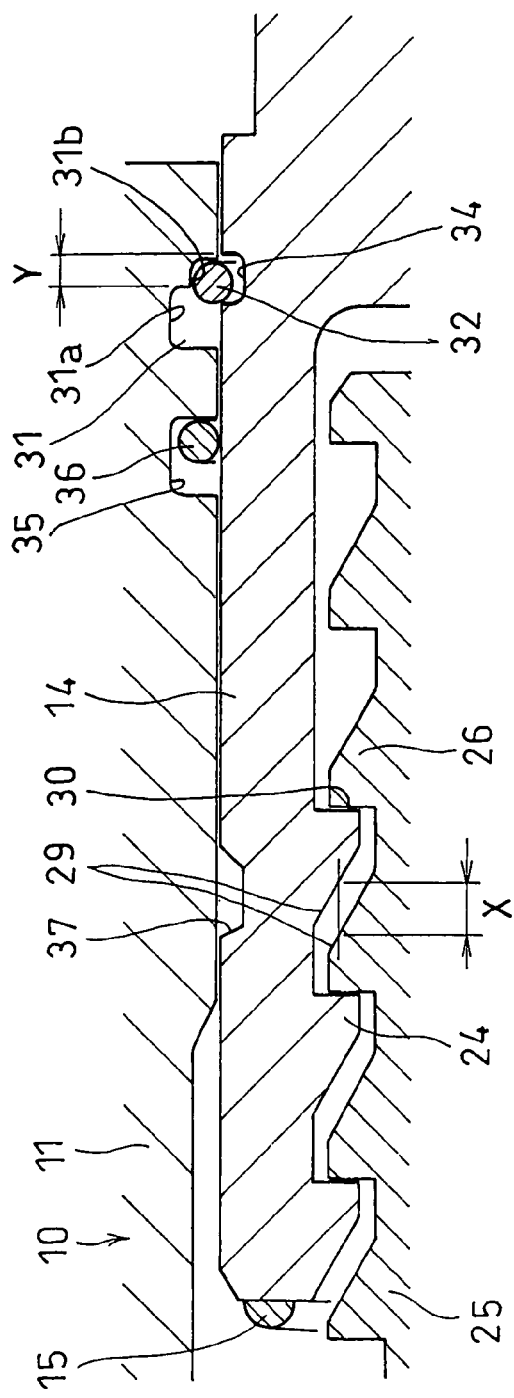
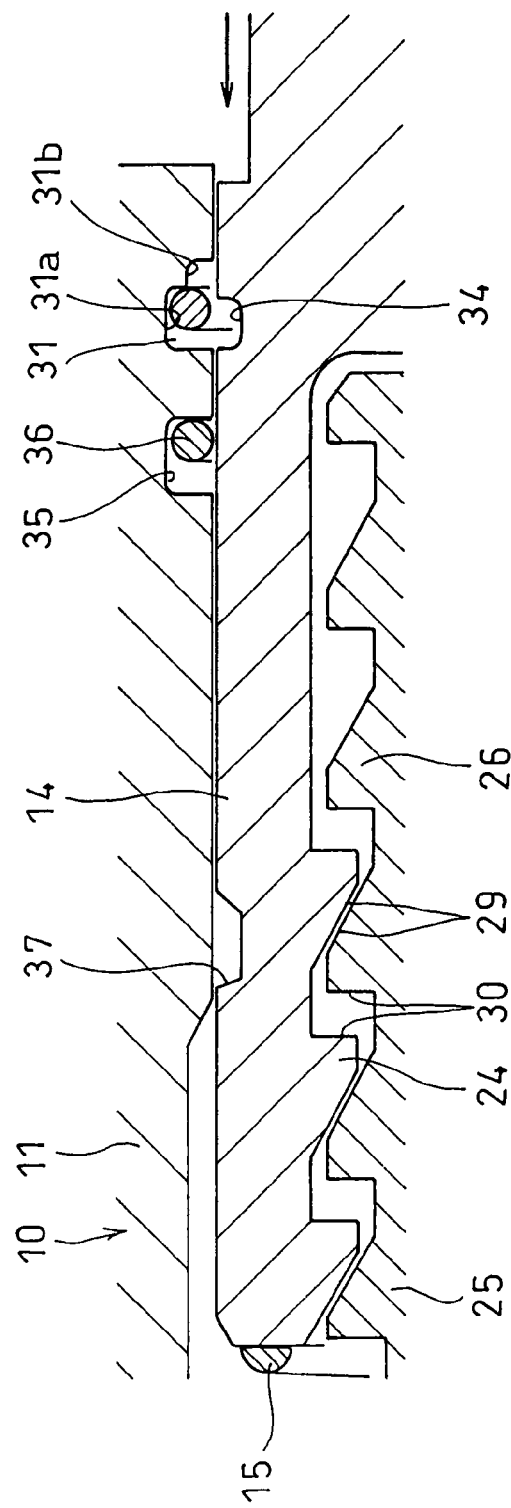
Fig.3A
Fig.3B

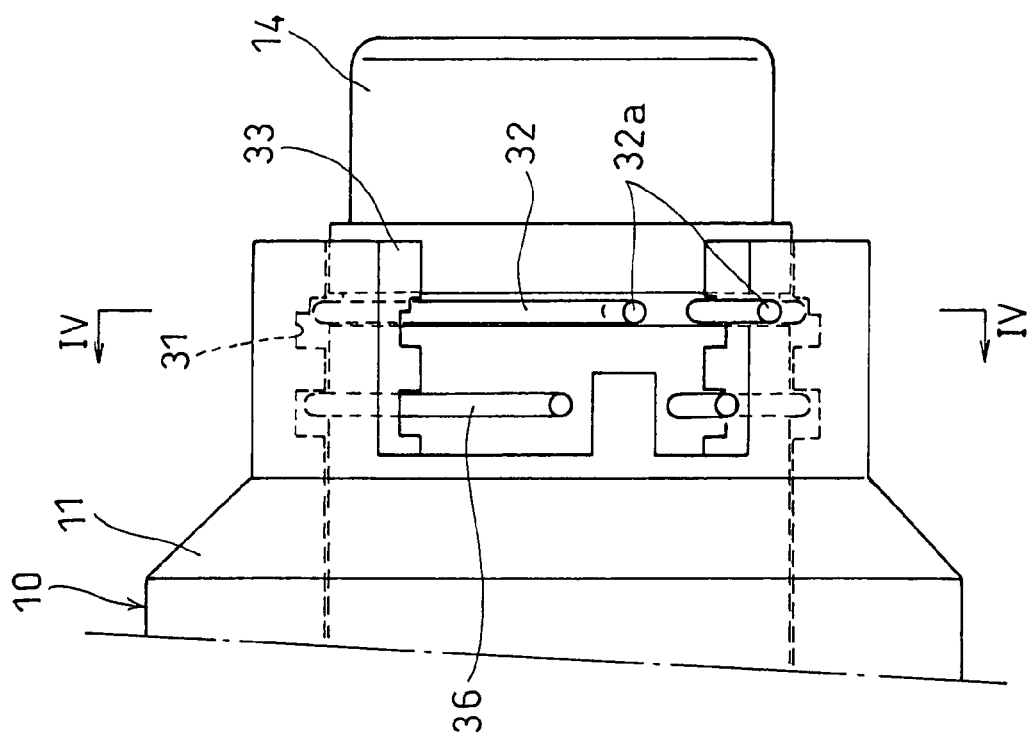
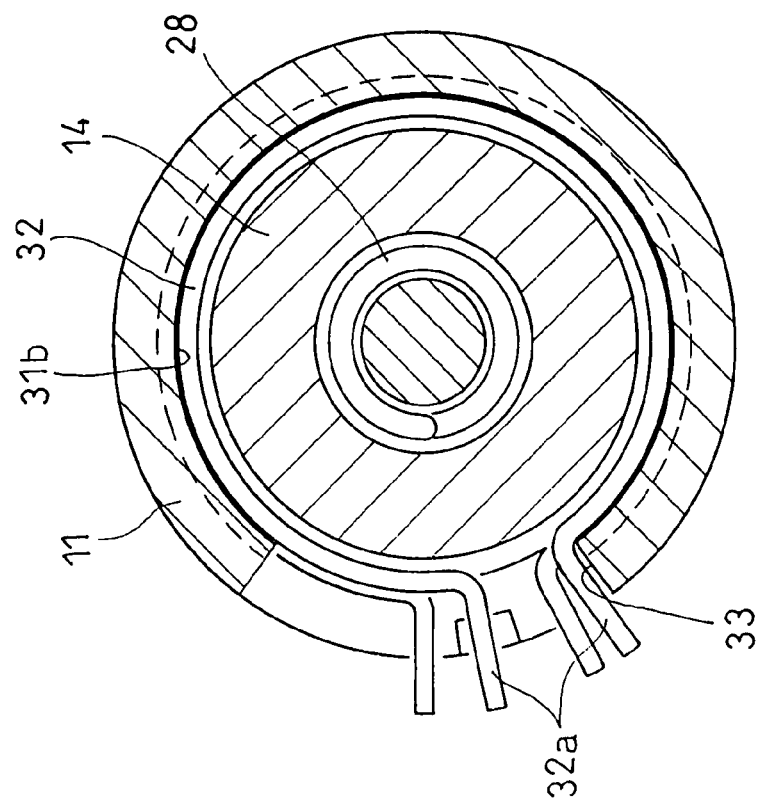
Fig.4A
Fig.4B

CHAIN TENSIONER

BACKGROUND OF THE INVENTION

This invention relates to a chain tensioner for keeping constant the tension of mainly chains and toothed belts for driving camshafts.

A chain transmission device for driving camshafts includes a chain trained around a sprocket mounted to an end of a crankshaft and sprockets each mounted to one end of one of the camshafts. In order to keep constant the tension of the chain, a pivotable chain guide is pressed against the slack side of the chain, and an adjusting force is applied to the chain guide from a chain tensioner.

A conventional chain tensioner used for such a chain transmission device is disclosed in JP patent publication 2000-179632A. This chain tensioner includes a housing defining a cylinder chamber, and a plunger slidably inserted in the cylinder chamber to define a pressure chamber in the housing. A return spring is mounted in the pressure chamber to bias the plunger outwardly of the cylinder chamber. An oil supply passage is formed in the housing to communicate with the pressure chamber. At its end opening to the pressure chamber, a check valve is provided. The plunger is formed with a rod inserting hole that opens to the rear end surface of the plunger which faces the pressure chamber. A screw rod formed with an external thread having a serration-shaped section on its outer periphery is inserted in the rod inserting hole with the external thread in threaded engagement with an internal thread, which also has a serration-shaped section, formed on the inner surface of the rod inserting hole near its rear opening. With this arrangement, the pushing force applied to the plunger from the chain through the chain guide is damped by hydraulic oil sealed in the pressure chamber. Also, by the abutment of pressure flanks of the internal and external threads, rearward movement of the plunger is prevented.

While this pushing force is larger than the force of the return spring, the plunger is allowed to move backward with the screw rod rotating until the pushing force balances with the force of the return spring, thereby keeping constant the tension of the chain.

When the chain slackens, the plunger is pushed outwardly under the force of the return spring and simultaneously, the screw rod is moved backward while turning under the force of a spring mounted in the rod inserting hole, thereby re-tensioning the chain.

When mounting such a chain tensioner, the housing has to be fixed in position with the plunger pushed into the housing. It is therefore troublesome to mount such a chain tensioner.

A chain tensioner disclosed in JP patent publication 2005-42806A includes a housing defining a cylinder chamber and formed with a set groove in its inner periphery near the opening of the cylinder chamber. A set ring having a circumferentially cut-apart portion so as to be elastically and radially deformable is received in the set groove. The plunger has an engaging groove formed in the outer periphery thereof near its front end. When the plunger is pushed into the cylinder chamber, the set ring engages in the engaging groove, thereby keeping the plunger pushed in the cylinder chamber (initial set state). After the chain tensioner is mounted in position, the plunger is further pushed into the cylinder chamber to disengage the set ring from the engaging groove. By releasing the plunger thereafter, the plunger protrudes from the cylinder chamber under the force of the return spring.

The inventors of the present invention thought that by using the technique of retaining the plunger in the initial set state as disclosed in the latter patent publication in the chain tensioner disclosed in the former patent publication, it would be possible to retain the plunger in the initial set state, so that the chain tensioner can be more easily mounted in position.

However, if the technique disclosed in the latter patent publication is used in the chain tensioner disclosed in the former patent publication, if the plunger is turned in such a direction that the axial gap between the internal and external threads disappears due e.g. to vibration during transportation of the chain tensioner with the plunger retained in the initial set state, there is a possibility that it becomes impossible to axially push in the plunger, so that the set ring remains engaged in the engaging groove and thus the plunger is stuck in the initial set state.

An object of this invention is to provide a chain tensioner which can be easily mounted in position and which can reliably prevent the plunger from getting stuck in the initial set state.

SUMMARY OF THE INVENTION

To achieve this object, the present invention provides a chain tensioner comprising a housing defining a cylinder chamber therein, a plunger slidably mounted in the cylinder chamber, defining a pressure chamber in the housing, a return spring mounted in the pressure chamber to bias the plunger outwardly of the cylinder chamber, the housing being formed with an oil supply passage communicating with the pressure chamber, a check valve disposed at one end of the oil supply passage opening to the pressure chamber, the plunger being formed with a rod inserting hole that opens to a rear end surface of the plunger, the rear end surface facing the pressure chamber, a screw rod having an external thread formed on an outer periphery thereof and inserted in the rod inserting hole with the external thread in threaded engagement with an internal thread formed on an inner periphery of the rod inserting hole near the rear end thereof, the external and internal threads having a serration-shaped section, and a spring mounted in the rod inserting hole and biasing the plunger and the screw rod axially away from each other, wherein a stepped set groove is formed in an inner periphery of the cylinder chamber near an open end thereof, the stepped set groove comprising a deep portion and a shallow portion which is located nearer to the open end than is the deep portion, the chain tensioner further comprising an elastically and radially deformable set ring having circumferentially separated ends and received in the set groove in a radially compressed state, the set ring having a pair of radially outwardly extending grip portions provided at the respective circumferentially separated ends thereof and disposed in a cutout formed in a front end portion of the housing, wherein an engaging groove is formed in an outer periphery of the plunger near a front end thereof, the set ring being configured to be engaged in both the shallow portion of the set groove and the engaging groove, thereby retaining the plunger in a position where the plunger is pushed into the housing, with one of the grip portions in abutment with one of a pair of circumferentially opposed end walls of the cutout, thereby preventing the plunger from rotating about its axis in such a direction that an axial gap between the internal and external threads disappears, and wherein when the set ring is engaged in both the shallow portion of the set groove and the engaging groove with the one of the grip portions in abutment with the one of the circumferentially opposed end walls, the axial gap is larger than an axial distance by which the plunger has to be moved to move the set ring from the shallow portion into the deep portion.

In this arrangement, with the set ring received in the deep portion of the stepped set groove, the plunger is pushed into the cylinder chamber until the engaging groove formed in the outer periphery of the plunger near its front end radially opposes the set ring. In this state, the grip portions are pinched to radially compress the set ring, thereby engaging the set ring in the engaging groove. Then, when the plunger is released, the plunger is moved outwardly under the force of the return spring until the set spring engages the shallow portion of the set groove. The plunger is thus retained in the initial set state in which the plunger is pushed into the cylinder chamber. In this state, the chain tensioner is mounted in position.

With the plunger retained in the initial set state, by bringing one of the grip portions of the set ring into abutment with one of the end walls of the cutout, it is possible to prevent the plunger from rotating about its axis in such a direction that the axial gap between the internal and external threads disappears.

Thus, this axial gap is kept larger than the axial distance by which the plunger has to be moved to move the set ring from the shallow portion into the deep portion. With this arrangement, when the engine is cranked and the chain is tensioned after the chain tensioner has been mounted in position, the plunger is pushed in by the chain until the set ring radially opposes the deep portion of the set groove. In this state, the set ring is allowed to radially expand and disengage from the engaging groove. The initial set state of the plunger is thus released.

Since it is possible to keep the plunger pushed in the cylinder chamber by engaging the set ring both in the shallow portion of the set groove and the engaging groove formed in the outer periphery of the plunger near its front end, the chain tensioner can be easily mounted in position.

With the plunger retained in the initial set state in which the plunger is pushed into the cylinder chamber, by bringing one of the grip portions of the set ring into abutment with one of the end walls of the cutout, the axial gap between the internal and external threads can be kept larger than the axial distance by which the plunger has to be moved to move the set ring from the shallow portion into the deep portion. Thus, when the engine is cranked and the chain is tensioned after the chain tensioner has been mounted in position, the plunger is pushed in by the chain, so that the initial set state of the plunger is reliably released.

BRIEF DESCRIPTION OF THE DRAWINGS

Other features and objects of the present invention will become apparent from the following description made with reference to the accompanying drawings, in which:

FIG. 2 is a vertical sectional front view of the chain tensioner according to the present invention;

FIGS. 3A and 3B are partial sectional views of the chain tensioner of FIG. 2, showing the initial set state of the plunger, and the state in which the initial set state has been released, respectively;

FIG. 4A is a side view of the front portion of the housing; and

FIG. 4B is a sectional view taken along line IV-IV of FIG. 4A.

DETAILED DESCRIPTION OF THE PREFERRED EMBODIMENTS

Figure 1:
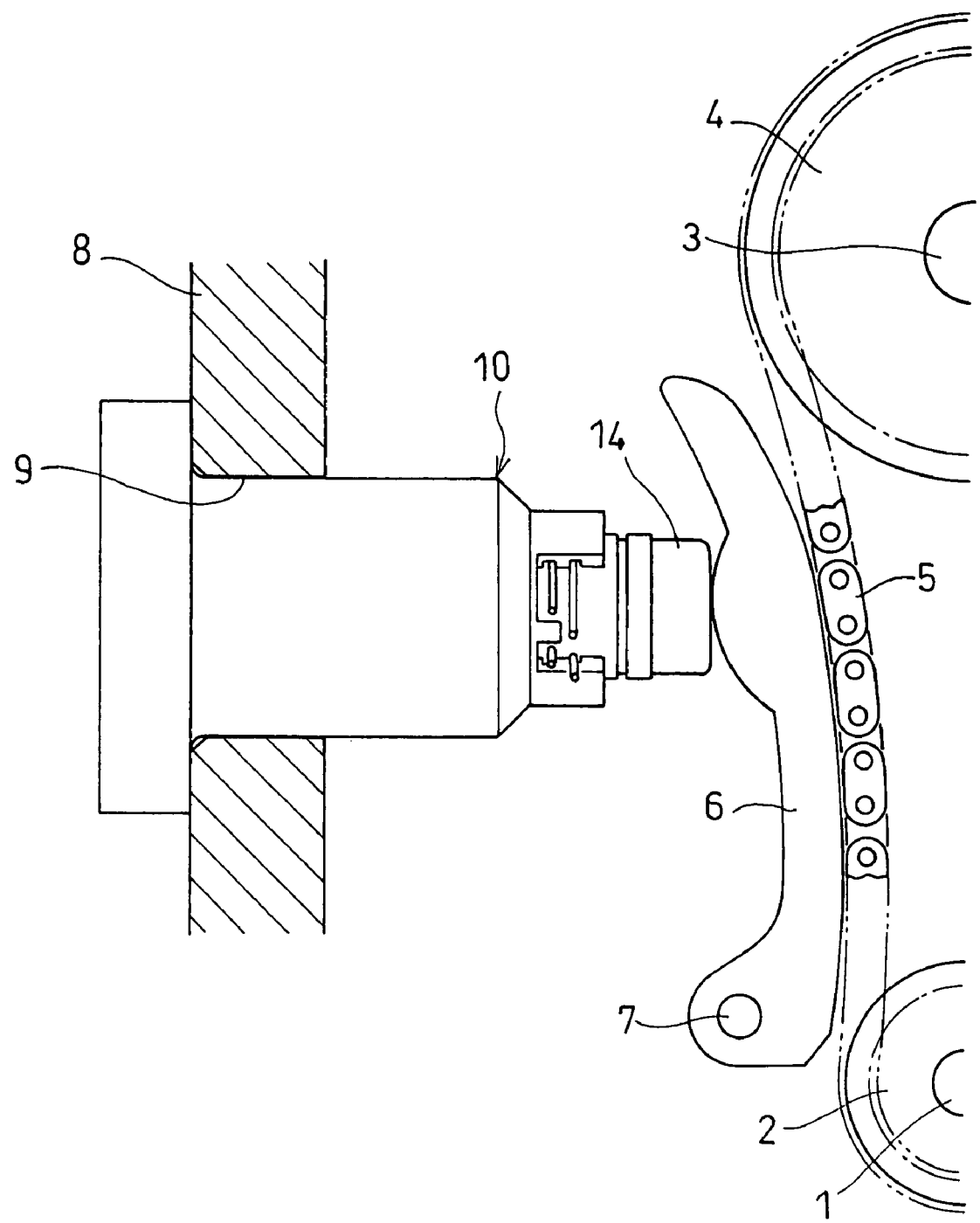
FIG. 1 is a schematic view of a chain tension adjusting device using a chain tensioner according to the present invention.

Now the embodiment of the invention is described with reference to the drawings. FIG. 1 shows a tension adjusting device for adjusting the tension of a chain for driving camshafts. As shown, the chain 5 is trained around a sprocket 2 mounted to an end of a crankshaft 1 and a sprocket 4 mounted to an end of a camshaft 3. A chain guide 6 is pressed against the slack side of the chain 5.

The chain guide 6 has its lower end pivotally mounted on a shaft 7. The chain guide 6 and the chain 5 are covered by an engine cover (timing cover) 8 mounted to an engine block.

The chain cover 8 is formed with a tensioner mounting hole 9 in which a chain tensioner 10 for applying tension to the chain 5 by pressing the chain guide 6 is mounted.

As shown in FIG. 2, the chain tensioner 10 includes a cylindrical housing 11 having a flange 12 provided on the outer periphery thereof at one end and bolted to the engine cover 8.

The housing 11 defines a cylinder chamber 13 having an opening at the other end of the housing 11, which is located inside the engine cover 8. A plunger 14 is slidably mounted in the cylinder chamber 13 to define a pressure chamber 16 in the housing 11. A return spring 15 is mounted in the pressure chamber 16 to bias the plunger 14 outwardly of the cylinder chamber 13.

In the closed end of the housing 11, an oil supply passage 17 is formed to communicate with the pressure chamber 16. A check valve 18 is provided at the end of the oil supply passage 17 opening to the pressure chamber 16.

The check valve 18 comprises a valve seat 19 fitted in the pressure chamber 16, a valve body 21 for selectively opening and closing a valve hole 20 formed in the valve body 21, and a retainer 22 for restricting the movement of the valve body 21, and thus the degree of opening of the valve hole 20. The check valve 18 closes the oil supply passage 17 whenever the pressure in the pressure chamber 16 is higher than the pressure of hydraulic oil supplied into the oil supply passage 17.

The plunger 14 is formed with a rod inserting hole 23 that opens to the rear end surface of the plunger 14 which faces the pressure chamber 16. A screw rod 25 formed with an external thread 26 on its outer periphery is inserted in the rod inserting hole 23 with the external thread 26 in threaded engagement with an internal thread 24 formed on the inner surface of the rod inserting hole 23 near its rear opening.

The screw rod 25 is formed with an axial stepped through hole 27. A spring 28 is mounted between the shoulder 27a of the through hole 27 and the closed end of the rod inserting hole 23. The spring 28 biases the plunger 14 and the screw rod 25 such that the plunger and the screw rod are axially moved away from each other.

As shown in FIG. 3A, the internal thread 24 and the external thread 26, which threadedly engages the internal thread 24, each have a pressure flank 29 for bearing the pushing force applied to the plunger 14, and a clearance flank 30. The pressure flank 29 has a larger flank angle than the clearance flank 30, so that the threads 24 and 26 have a serration-shaped section. Also, the threads 24 and 26 have such a lead angle that allows the plunger 14 and the screw rod 25 to be axially moved away from each other while rotating.

As shown in FIGS. 3A, 3B, 4A and 4B, a set groove 31 is formed in the inner surface of the cylinder chamber 13 near its open end. The set groove 31 is a stepped groove comprising a deep portion 31a and a shallow portion 31b which is provided nearer to the open end of the cylinder chamber 13 than is the deep portion 31a.

A radially and elastically deformable set ring 32 is received in the set groove 31. The set ring 32 has circumferentially separated ends each having a radially outwardly extending grip portions 32a. By pinching and moving the grip portions 32a toward each other, the set ring 32 is radially compressed.

With the set ring 32 radially compressed, it is received in the set groove 31 with the grip portions 32a received in a cutout 33 formed in the housing 11 at its front end.

FIG. 3A shows the state in which the set ring 32 is received in the shallow portion 31b of the set groove 31 while in elastic contact with its radially inwardly facing surface. The shallow portion 31b has such a depth that in the state of FIG. 3A, the inner diameter of the set ring 32 is smaller than the outer diameter of the plunger 14.

FIG. 3B shows the state in which the set ring 32 is received in the deep portion 31a of the set groove 31 while in elastic contact with its radially inwardly facing surface. The deep portion 31a has such a depth that in the state of FIG. 3B, the inner diameter of the set ring 32 is larger than the outer diameter of the plunger 14.

As shown in FIG. 3A, an engaging groove 34 in which the set ring 32 is engageable is formed in the outer periphery of the plunger 14 near its front end.

FIG. 3A shows the state in which the set ring 32 engages both in the engaging groove 34 and the shallow portion 31b of the set groove 31. In this state, the plunger 14 is prevented from protruding outwardly.

With the set ring 32 engaged in both the engaging groove 34 and the shallow portion 31b of the set groove 31, and one of the grip portions 32a in abutment with one of the end walls of the cutout 33 as shown in FIG. 4, thereby preventing the plunger 14 from rotating about its axis in such a direction that the axial gap X (see FIG. 3A) between the internal thread 24 and the external thread 26 disappears, the axial gap X is determined to be larger than the axial distance Y by which the plunger 14 has to be moved to move the set ring 32 from the shallow portion 31b of the set groove 31 into its deep portion 31a (X>Y).

As shown in FIG. 3A, a ring groove 35 is formed in the inner periphery of the cylinder chamber 13 near its open end, slightly spaced from the set groove 31 toward the closed end of the cylinder chamber 13. A ring 36 for preventing the plunger from being pulled out of the cylinder chamber is engaged in the ring groove 35 in a radially expanded state. A stopper groove 37 is formed in the outer periphery of the plunger 14 near its rear end. When the ring 36 engages in the stopper groove 37, the plunger 14 is prevented from being pulled out of the cylinder chamber 13.

To mount this chain tensioner 10 to a device for adjusting the tension of a cam-driving chain, as shown in FIG. 3B, the set ring 32 is engaged in the deep portion 31a of the set groove 31, and the plunger 14 is pushed into the cylinder chamber, with the set ring 32 in elastic contact with the radially inwardly facing surface of the deep portion 31a, until the engaging groove 34 of the plunger 14 radially opposes the set ring 32. In this state, the grip portions 32a are pinched to radially compress the set ring 32 until the ring 32 engages in the engaging groove 34. In this state, the plunger 14 is released to allow the plunger 14 to move outwardly.

When the plunger 14 moves outwardly, as shown in FIG. 3A, the set ring 32 engages in the shallow portion 31b and is trapped between the end wall of the shallow portion 31b and the rear end wall of the engaging groove 34. Thus, it is possible to keep the plunger 14 pushed in the cylinder chamber (initial set state). With the plunger 14 trapped in the initial set state, the grip portions 32a are released, and the chain tensioner is mounted in position.

Because it is possible to keep the plunger 14 pushed in the cylinder chamber by engaging the set ring 32 in the engaging groove 34 and then in the shallow portion 31b of the set groove 31, it is not necessary to manually keep pushing the plunger 14 into the cylinder chamber when mounting the chain tensioner 10. Thus, the chain tensioner can be easily mounted in position.

When transporting the chain tensioner 10 before being mounted in position, with the plunger held in the initial set state, one of the grip portions 32a of the set ring 32 is kept in abutment with one of the end walls of the cutout 33.

By keeping one of the grip portions 32a in abutment with one of the end walls of the cutout 33, it is possible to prevent the plunger 14 from rotating about its axis in such a direction that the axial gap between the internal thread 24 and the external thread 26 disappears due e.g. to vibration during transportation of the chain tensioner.

Thus, the axial gap X is kept larger than the axial distance Y by which the plunger 14 has to be pushed in to move the set ring 32 from the shallow portion 31b of the set groove 31 into its deep portion 31a. In this state, the chain tensioner 10 is mounted in position. When the engine is cranked thereafter, tension is applied to the chain 5 shown in FIG. 1, so that a pushing force is applied to the plunger 14, and the plunger 14 is pushed into the cylinder chamber 13.

As shown in FIG. 3A, because the axial gap X between the internal thread 24 and the external thread 26 is larger than the axial distance Y by which the plunger 14 has to be pushed in to move the set ring 32 from the shallow portion 31b of the set groove 31 into its deep portion 31a, when the chain 5 is tensioned, and the plunger 14 is pushed in by the chain 5, the plunger 14 is pushed in until the set ring 32 radially opposes the deep portion 31a of the set groove 31. When the set ring 32 radially opposes the deep portion 31a, the set ring 32 is allowed to radially expand and disengage from the engaging groove 34, so that the initial set state of the plunger 14 is released.

In the initial set state in which the plunger 14 is pushed into the cylinder chamber 13, the axial gap X between the internal thread 24 and the external thread 26 can be kept larger than the axial distance Y by which the plunger 14 has to be pushed in to move the set ring 32 from the shallow portion 31b of the set groove 31 into its deep portion 31a by keeping one of the grip portions 32a of the set ring 32 in abutment with one end wall of the cutout 33. Thus, after mounting the chain tensioner 10 in position, when the engine is cranked, the chain 5 is tensioned and the plunger is pushed in by the chain 5. Thus, the initial set state of the plunger 14 can be reliably released.

After mounting the chain tensioner 10, hydraulic oil is supplied into the pressure chamber 16 through the oil supply passage 17 until the pressure chamber 16 is filled with hydraulic oil. In this state, when the chain vibrates due e.g. to torque fluctuations resulting from the rotation of the camshaft 3, and the slack side of the chain slackens, the plunger 14 is pushed out under the force of the return spring 15, and simultaneously, the screw rod 25 moves back while turning until it abuts the valve seat 19. The chain 5 is thus tensioned again.

When the tension of the slack side of the chain 5 increases and a pushing force is applied to the plunger 14 from the chain 5 through the chain guide 6, the pushing force is damped by the hydraulic oil sealed in the pressure chamber 16. If this pushing force is larger than a predetermined value, the pressure flanks 29 of the internal thread 24 and the external thread 26 are pressed against each other, so that the pushing force is supported by the pressure flanks 29.

If the pushing force is larger than the force of the return spring 15, slip occurs between the contact surfaces of the pressure flanks 29, which are pressed against each other. Thus, the screw rod 25 rotates to allow the plunger 14 to slowly retract while turning until the pushing force balances with the force of the return spring 15. The tension of the chain 5 is thus kept constant.

What is claimed is:

1. A chain tensioner comprising a housing defining a cylinder chamber therein, a plunger slidably mounted in said cylinder chamber, defining a pressure chamber in said housing, a return spring mounted in said pressure chamber to bias said plunger outwardly of said cylinder chamber, said housing being formed with an oil supply passage communicating with said pressure chamber, a check valve disposed at one end of said oil supply passage opening to said pressure chamber, said plunger being formed with a rod inserting hole that opens to a rear end surface of said plunger, said rear end surface facing said pressure chamber, a screw rod having an external thread formed on an outer periphery thereof and inserted in said rod inserting hole with said external thread in threaded engagement with an internal thread formed on an inner periphery of said rod inserting hole near the rear end thereof, said external and internal threads having a serration-shaped section, and a spring mounted in said rod inserting hole and biasing said plunger and said screw rod axially away from each other, wherein a stepped set groove is formed in an inner periphery of said cylinder chamber near an open end thereof, said stepped set groove comprising a deep portion and a shallow portion which is located nearer to said open end than is said deep portion, said chain tensioner further comprising an elastically and radially deformable set ring having circumferentially separated ends and received in said set groove in a radially compressed state, said set ring having a pair of radially outwardly extending grip portions provided at the respective circumferentially separated ends thereof and disposed in a cutout formed in a front end portion of said housing, wherein an engaging groove is formed in an outer periphery of said plunger near a front end thereof, said set ring being configured to be engaged in both said shallow portion of said set groove and said engaging groove, thereby retaining said plunger in a position where said plunger is pushed into said housing, with one of said grip portions in abutment with one of a pair of circumferentially opposed end walls of said cutout, thereby preventing said plunger from rotating about its axis in such a direction that an axial gap between said internal and external threads disappears, and wherein when said set ring is engaged in both said shallow portion of said set groove and said engaging groove with said one of said grip portions in abutment with said one of said circumferentially opposed end walls, said axial gap is larger than an axial distance by which said plunger has to be moved to move said set ring from said shallow portion into said deep portion.

* * * * *